United States Patent
Sarkar et al.

(10) Patent No.: US 10,737,904 B2
(45) Date of Patent: Aug. 11, 2020

(54) ELEVATOR CONDITION MONITORING USING HETEROGENEOUS SOURCES

(71) Applicant: OTIS ELEVATOR COMPANY, Farmington, CT (US)

(72) Inventors: Soumalya Sarkar, Manchester, CT (US); Murat Yasar, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 547 days.

(21) Appl. No.: 15/670,737

(22) Filed: Aug. 7, 2017

(65) Prior Publication Data
US 2019/0039858 A1 Feb. 7, 2019

(51) Int. Cl.
| | |
|---|---|
| *B66B 5/00* | (2006.01) |
| *B66B 7/02* | (2006.01) |
| *G05B 23/02* | (2006.01) |
| *G06K 9/62* | (2006.01) |
| *G06Q 10/00* | (2012.01) |

(52) U.S. Cl.
CPC .......... *B66B 5/0018* (2013.01); *B66B 5/0025* (2013.01); *B66B 5/0037* (2013.01); *B66B 5/0093* (2013.01); *B66B 7/02* (2013.01); *G05B 23/0283* (2013.01); *G06K 9/624* (2013.01); *G06K 9/6277* (2013.01); *G06Q 10/20* (2013.01)

(58) Field of Classification Search
CPC ... B66B 5/0018; B66B 5/0025; B66B 5/0037; B66B 5/0093
USPC ....................................................... 187/247
See application file for complete search history.

(56) References Cited

U.S. PATENT DOCUMENTS

| | | | |
|---|---|---|---|
| 4,649,515 A | | 3/1987 | Thompson et al. |
| 5,307,903 A | * | 5/1994 | Morita ...................... B66B 1/18 187/380 |
| 5,892,190 A | * | 4/1999 | Morita ...................... B66B 1/18 187/382 |
| 6,353,816 B1 | * | 3/2002 | Tsukimoto ............... G06N 3/08 706/17 |

(Continued)

FOREIGN PATENT DOCUMENTS

| | | |
|---|---|---|
| CN | 105645209 A | 6/2016 |
| CN | 106503731 A | 3/2017 |

(Continued)

OTHER PUBLICATIONS

European Search Report for application EP 18187838.0, dated Feb. 14, 2019, 8 pages.

*Primary Examiner* — David S Warren
(74) *Attorney, Agent, or Firm* — Cantor Colburn LLP

(57) ABSTRACT

A condition monitoring system for performing a transformation of mixed elevator data is provided. The condition monitoring system includes a computer sub-system. The computer sub-system includes a memory storing transformation software and a processor coupled to the memory. The processor executes the transformation software to cause the condition monitoring system to acquire quantitative and qualitative information and transform the quantitative and qualitative information to produce transformed information. The processor executes the transformation software to further cause the condition monitoring system to execute analytics on the transformed information and generate predictions based on the analytics of the transformed information.

18 Claims, 3 Drawing Sheets

(56) References Cited

U.S. PATENT DOCUMENTS

| | | | |
|---|---|---|---|
| 6,519,552 | B1 | 2/2003 | Sampath et al. |
| 6,947,797 | B2 | 9/2005 | Dean et al. |
| 8,620,853 | B2 | 12/2013 | Herzog |
| 8,797,405 | B2 | 8/2014 | Cobb et al. |
| 9,483,049 | B2 | 11/2016 | Maeda et al. |
| 10,127,913 | B1 * | 11/2018 | Mokrushin ......... G10L 19/0018 |
| 2012/0041575 | A1 | 2/2012 | Maeda et al. |
| 2012/0271587 | A1 | 10/2012 | Shibuya et al. |
| 2013/0173218 | A1 | 7/2013 | Maeda et al. |
| 2013/0339518 | A1 * | 12/2013 | Schimpfky ......... G06F 11/3003 709/224 |
| 2014/0195184 | A1 | 7/2014 | Maeda et al. |
| 2015/0153380 | A1 | 6/2015 | Elhoushi et al. |
| 2016/0253681 | A1 * | 9/2016 | de Souza ................ G06F 16/26 705/13 |
| 2018/0052835 | A1 * | 2/2018 | Billi-Duran ........... G06F 16/487 |
| 2018/0088564 | A1 * | 3/2018 | Billi-Duran ...... G05B 19/41865 |
| 2019/0039858 | A1 * | 2/2019 | Sarkar ................... G06K 9/624 |
| 2019/0063903 | A1 * | 2/2019 | Dou ..................... G01N 21/952 |
| 2019/0279281 | A1 * | 9/2019 | Kumar ................. G06F 16/283 |

FOREIGN PATENT DOCUMENTS

| | | |
|---|---|---|
| EP | 2317437 A2 | 5/2011 |
| WO | 2016144586 A1 | 9/2016 |
| WO | 2016144587 A1 | 9/2016 |

\* cited by examiner

ELEVATOR CONDITION MONITORING USING HETEROGENEOUS SOURCES

BACKGROUND

In general, contemporary elevator condition monitoring only utilizes numerical data to broadly determine a condition of an elevator. However, because contemporary elevator condition monitoring is limited to the numerical data only, it may be difficult to obtain an accurate inference as to the condition of the elevator.

BRIEF DESCRIPTION

According to one or more embodiments, a condition monitoring system for performing a transformation of mixed elevator data is provided. The condition monitoring system comprises: a computer sub-system comprising a memory storing a transformation software thereon, and a processor coupled to the memory, the processor configured to execute the transformation software to cause the condition monitoring system to: acquire quantitative and qualitative information; transform the quantitative and qualitative information to produce transformed information; execute analytics on the transformed information; and generate predictions based on the analytics of the transformed information.

According to one or more embodiments or the above condition monitoring system, the qualitative information can comprise non-numerical data.

According to one or more embodiments or any of the above condition monitoring systems, the qualitative information can comprise categorical data.

According to one or more embodiments or any of the above condition monitoring systems, the transformation of the quantitative information can comprise executing a mutual information based feature transformation on the categorical data to produce continuous data.

According to one or more embodiments or any of the above condition monitoring systems, the mutual information based feature transformation can preserve a probability distribution of the categorical data to provide an equivalence value to the categorical data.

According to one or more embodiments or any of the above condition monitoring systems, the quantitative information can comprise numerical data.

According to one or more embodiments or any of the above condition monitoring systems, the transformation of the quantitative information can comprise normalizing the numerical data to produce normalized numerical data.

According to one or more embodiments or any of the above condition monitoring systems, the quantitative and qualitative information can be derived from an elevator sub-system of the condition monitoring system.

According to one or more embodiments or any of the above condition monitoring systems, the quantitative and qualitative information can be stored on a database of the condition monitoring system.

According to one or more embodiments, a processor-implemented method for performing a transformation of mixed elevator data is provided. The processor-implemented method being implemented by transformation software stored on a memory of a computer sub-system. The transformation software being executed by a processor of the computer sub-system. The processor being coupled to the memory. The processor-implemented method comprises: acquiring, by the processor, quantitative and qualitative information; transforming, by the processor, the quantitative and qualitative information to produce transformed information; executing, by the processor, analytics on the transformed information; and generating, by the processor, predictions based on the analytics of the transformed information.

According to one or more embodiments or the above processor-implemented method, the qualitative information can comprise non-numerical data.

According to one or more embodiments or any of the above processor-implemented methods, the qualitative information can comprise categorical data.

According to one or more embodiments or any of the above processor-implemented methods, the transformation of the quantitative information can comprise executing a mutual information based feature transformation on the categorical data to produce continuous data.

According to one or more embodiments or any of the above processor-implemented methods, the mutual information based feature transformation can preserve a probability distribution of the categorical data to provide an equivalence value to the categorical data.

According to one or more embodiments or any of the above processor-implemented methods, the quantitative information can comprise numerical data.

According to one or more embodiments or any of the above processor-implemented methods, the transformation of the quantitative information can comprise normalizing the numerical data to produce normalized numerical data.

According to one or more embodiments or any of the above processor-implemented methods, the quantitative and qualitative information can be derived from an elevator sub-system of the condition monitoring system.

According to one or more embodiments or any of the above processor-implemented methods, the quantitative and qualitative information can be stored on a database of the condition monitoring system.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

Figure 1:
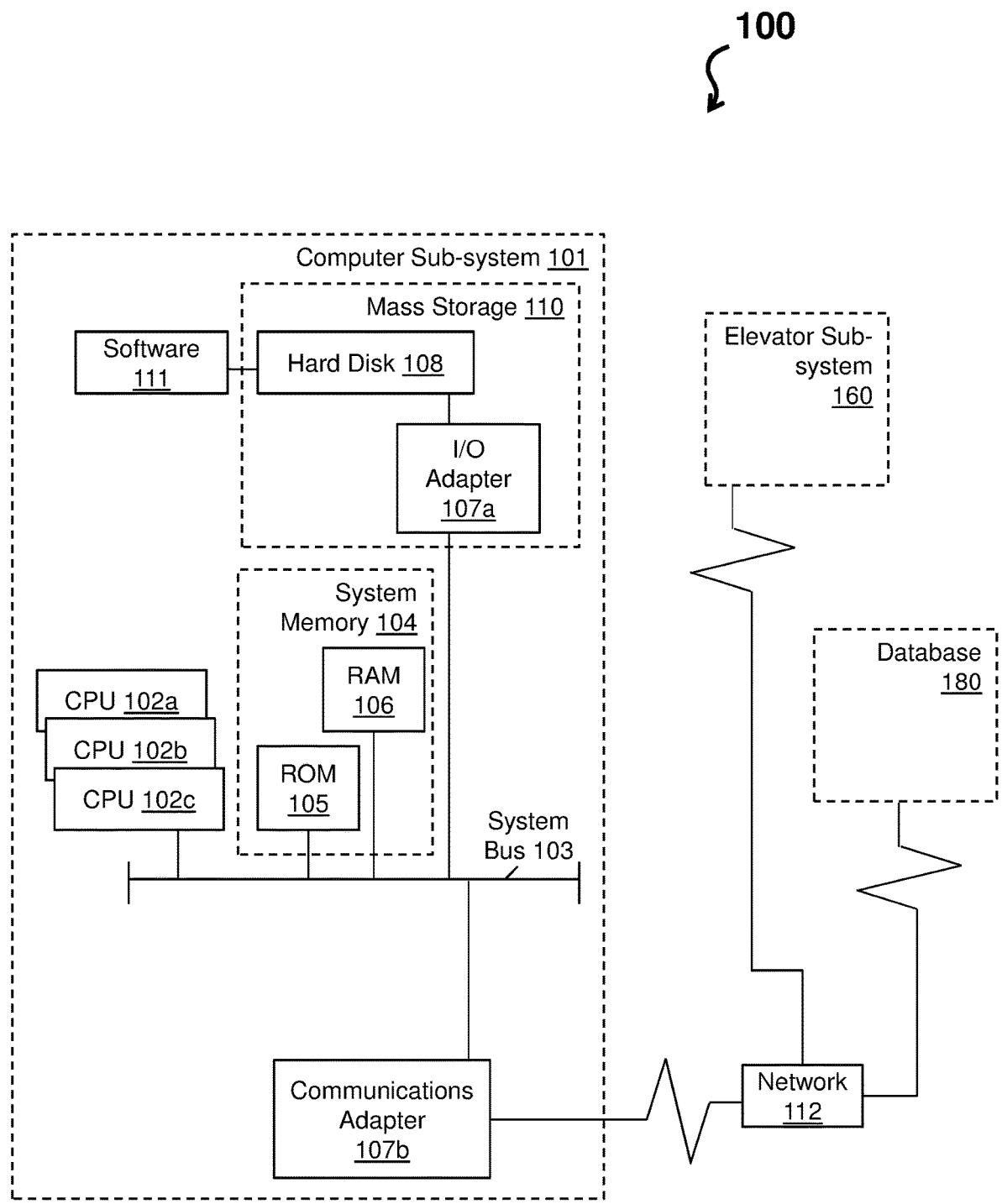
FIG. 1 depicts a condition monitoring system according to one or more embodiments.

A detailed description of one or more embodiments of the disclosed apparatus and method are presented herein by way of exemplification and not limitation with reference to the FIGS.

Embodiments herein provide a robust and efficient condition monitoring system, method, and/or computer program product (herein collectively referred to as condition monitoring system) that transforms mixed data to a form that is amenable for data analytics and condition monitoring. Embodiments herein are described with respect to elevators and elevators systems, but are not limited thereto.

A condition of the elevator and/or elevator system depends on multiple factors. To monitor the condition of the elevator and/or elevator system, the condition monitoring system analyzes 'heterogeneous' or 'mixed' data sources/data comprising quantitative and qualitative variables. The quantitative and qualitative variables can be provided by one or more sensors, one or more controllers, one or more actuators, one or more processors, etc. of the elevator and/or elevator system. Quantitative variables, which reside in a numerical or continuous domain, can include discrete or continuous changeable elements (e.g., discrete numerical data are counted, while continuous numerical data are measured). Qualitative variables, which reside in a non-numerical domain, can include descriptive information in the form of transactional, categorical, and/or textual data.

In accordance with one or more embodiments, the mixed elevator sources/data can be categorized in three or more buckets (e.g., the quantitative and qualitative variables can fall into multiple categories). Exemplary buckets include unit data, event-based data, periodic data, and request based data.

Unit data, also referred to as elevator system data, can include static information such as customer information, building type, unit type, and name of supervisor etc.

Event-based data is collected when an event occurs. In accordance with one or more embodiments, event-based information can include door status (open or closed), position of elevator, textual details describing an emergency, etc. when an elevator alarms and/or alerts occur. Event-based data can also include scheduled maintenance actions, scheduled and unscheduled repairs and customer initiated callbacks.

Periodic data can include cumulative information collected periodically at a specified rate (also referred to as performance variables). In accordance with one or more embodiments, cumulative information can include number of elevators calls, number of elevator calls per floor, number of elevator trips, etc. collected at a designated interval (e.g., every minute, every ten minutes, every hour, every evening at a predesignated time, etc.) each of which indicates the performance of the elevator.

Request based data can be status information collected by request. In accordance with one or more embodiments, status information can include elevator state information of one or more elevator controllers provided upon request to a computer system in communication with the one or more elevator controllers.

In an exemplary operation, the condition monitoring system maps individual data series from a non-numerical domain of mixed elevator data (e.g., qualitative variables of one or more of the exemplary buckets) to a numerical/continuous domain. When mapping of the individual data series between domains, the condition monitoring system preserves any information content of the mixed elevator data (such as in an information theory Shannon sense). Also, the condition monitoring system normalizes individual data series from the numerical/continuous domain of the mixed elevator data. Once the individual data series (from both domains) are transformed (mapped/normalized) into the continuous domain, the condition monitoring system implements machine learning on the transformed data in support monitoring the condition of the elevator as further described herein. Thus, in contrast to contemporary elevator condition monitoring that uses only numeric data, the condition monitoring system described herein enables use from both domains.

The technical effects and benefits of the condition monitoring system includes addresses lack of sensor fusion for heterogeneous attributes, loss of information in discretization, or completely discarding non-numeric data which results in inferior predictions of elevator condition. The embodiments herein are necessarily rooted in the condition monitoring system (or processor thereof) to provide these technical effects and overcome the problems associated with the contemporary elevator condition monitoring.

FIG. 1 depicts an example of a condition monitoring system 100 according to one or more embodiments. The condition monitoring system 100 can be an electronic, computer framework comprising and/or employing any number and combination of computing device and networks utilizing various communication technologies, as described herein. The condition monitoring system 100 can be scalable, extensible, and modular, with the ability to change to different services or reconfigure some features independently of others.

The condition monitoring system 100 comprises a computer sub-system 101 that has one or more central processing units (CPU(s)) 102a, 102b, 102c, etc. (collectively or generically referred to as processor(s) 102). The processors 102, also referred to as processing circuits, are coupled via a system bus 103 to system memory 104 and various other components. The system memory 104 can include a read only memory (ROM) 105 and a random access memory (RAM) 106. The ROM 105 is coupled to the system bus 103 and may include a basic input/output system (BIOS), which controls certain basic functions of the computer sub-system 101. The RAM is read-write memory coupled to the system bus 103 for use by the processors 102.

The computer sub-system 101 further comprises an input/output (I/O) adapter 107a and a communications adapter 107b coupled to the system bus 103. The I/O adapter 107a may be a small computer system interface (SCSI) adapter that communicates with a hard disk 108 and/or any other similar component. The I/O adapter 107a and the hard disk 108 are collectively referred to herein as a mass storage 110. The mass storage 110 is an example of a tangible storage medium readable by the processors 102, where a software 111 (e.g., transformation software) is stored for execution. The communications adapter 107b interconnects the system bus 103 with a network 112, which may be an outside network, enabling the computer sub-system 101 to communicate with other such systems, such as the elevator sub-system 160 and/or a database 180.

The elevator sub-system 160 can comprise any elevator, escalator, and/or transportation mechanism that produces operational data (such as the mixed elevator data generated from one or more sensors, one or more controllers, one or more actuators, one or more processors, etc. of the elevator and/or elevator system described herein). The elevator sub-system 160 can provide from the one or more sensors, the one or more controllers, the one or more actuators, the one or more processors, etc. to the computer sub-system 101 and/or store in the database 180 the mixed elevator data with respect to operations of the elevator sub-system 160.

The database 180 can also provide to the computer sub-system 101 any stored mixed elevator data. In addition, the database 180 can provide use maintenance data, customer call back data, weather data, contract data, etc., for use by the condition monitoring system 100. According to one or more embodiments, the computer sub-system 101 and/or the database 180 can collect the mixed data from the elevator sub-system 160. According to one or more embodiments, a collector of the elevator sub-system 160 can collect the mixed data and provide the mixed data to the computer sub-system 101 and/or the database 180 upon request.

Figure 2:
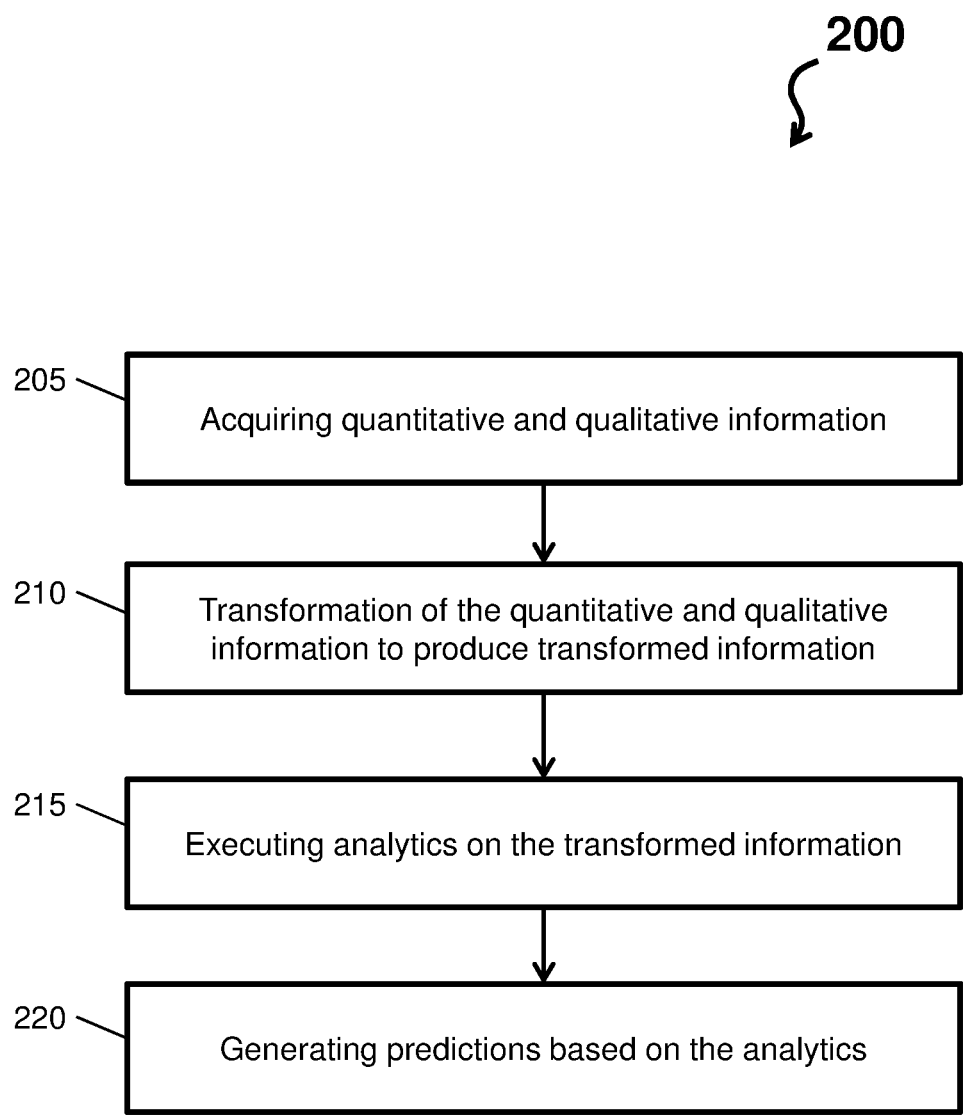
FIG. 2 depicts a process flow with respect to a condition monitoring system according to one or more embodiments.
Figure 3:
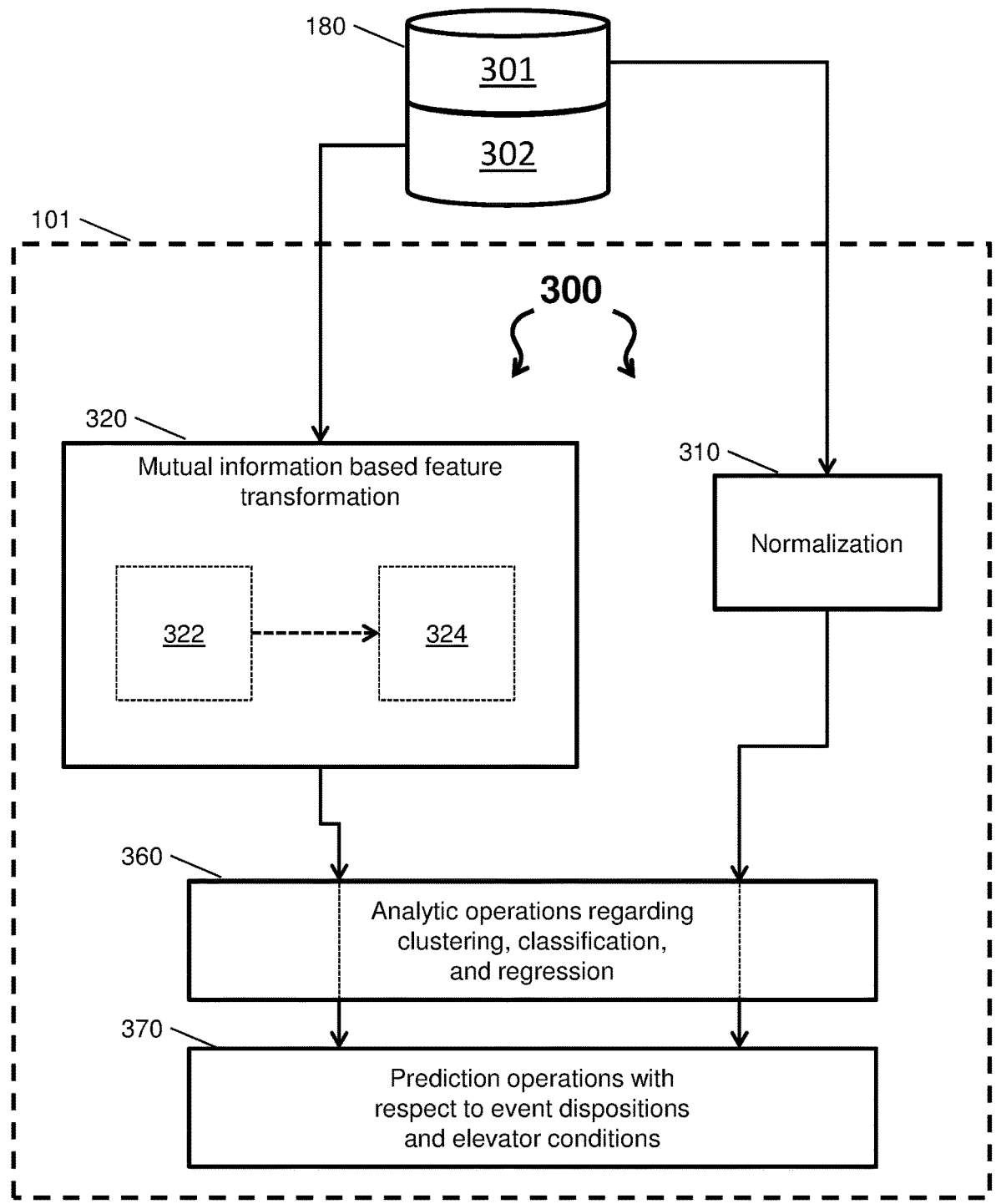
FIG. 3 depicts an operational flow of a condition monitoring system with respect to a condition monitoring system according to one or more embodiment.

The mass storage 110 is an example of a tangible storage medium readable by the processors 102, where the software 111 is stored as instructions for execution by the processors 102 to cause the computer sub-system 101 (and/or the condition monitoring system 100) to operate, such as is described herein with reference to FIGS. 2 and 3. Examples of computer program product and the execution of such instruction is discussed herein in more detail.

Turning now to FIG. 2, a process flow 200 performing a transformation of mixed elevator data with respect to the condition monitoring system 100 of FIG. 1 is depicted according to one or more embodiments. The process flow 200 begins at block 205, where the processor 102 (e.g., the computer sub-system 101 and/or the condition monitoring system 100) acquires quantitative (e.g., number of elevators calls, number of elevator calls per floor, number of elevator trips etc.) and qualitative information (e.g., building type, unit type, door status, landing etc.).

At block 210, the processor 102 (e.g., the computer sub-system 101 and/or the condition monitoring system 100) transforms the quantitative and qualitative information to produce transformed information. For instance, the processor 102 maps individual data series from the qualitative information (e.g., 20 different unit types) to a continuous domain while preserving information content and normalizes individual data series from the quantitative information to produce transformed information (e.g., unit type abstraction in continuous domain with equivalent probability distribution).

At block 215, the processor 102 (e.g., the computer sub-system 101 and/or the condition monitoring system 100) executes analytics (e.g., clustering, anomaly detection and trend detection etc.) on the transformed information.

At block 220, the processor 102 (e.g., the computer sub-system 101 and/or the condition monitoring system 100) generates predictions (e.g., classification of healthy units vs. unhealthy units, prediction of when an unhealthy unit requires maintenance) based on the analytics.

Turning now to FIG. 3, a process flow 300 performing a transformation of mixed elevator data with respect to the condition monitoring system 100 of FIG. 1 is depicted according to one or more embodiments. As depicted, the database 180 provides mixed elevator data to the computer sub-system 101 (e.g., the condition monitoring system 100 acquires quantitative and qualitative information). The mixed elevator data can comprise numerical data 301 and non-numerical data 302.

The process flow 300 begins at block 310, where the computer sub-system 101 normalizes (e.g., zero mean, unit variance normalization across fleet) the numerical data 301. Normalization is a process of organizing the numerical data 301 to reduce data redundancy and improve data integrity. The result of the normalization is an output of normalized numerical data.

At block 320, the computer sub-system 101 executes a mutual information based feature transformation on the non-numerical data 302. According to one or more embodiments, the mutual information based feature transformation can comprise categorical data 322 that is transformed to continuous data 324. The mutual information is maximized so that the condition monitoring system 100 does not lose information between categorical data 322 and the continuous data 324 (e.g., a probability distribution of the categorical data 322 is preserved such that the continuous data 324 comprises a maximum of an equivalence value to the categorical data 322). Thus, the result of this transformation is an output of the continuous data 324.

In accordance with one or more embodiments, a given non-numerical data (e.g. drive state) can be defined by Formula 1.

$$X=\{x_i | i=1, \ldots, n\}$$  Formula 1

Using equation 1, the condition monitoring system 100 identifies a numerical (continuous) transformation, $\tilde{X}$, of X such that the entropy of the transformation, $H(X|\tilde{X})$, is minimized, i.e., no information is lost or artificially added (as shown in Formula 2).

$$\min_{\{\mu_i, \sigma_i\}} H(X|\tilde{X})$$  Formula 2

The condition monitoring system 100 then operates under an assumption that $(\tilde{x}|x=)\,x_i$ and $p(\tilde{x})$ are normally distributed (e.g., Gaussian), such that $H(X|\tilde{X})=0$ and the mutual information between X and $\tilde{X}$ is equal to a Shannon entropy of X (as shown in Formula 3).

$$I(\tilde{X};X)=H(X)-H(X|\tilde{X}) \rightarrow I(\tilde{X};X)=H(X)$$  Formula 3

Note that $I(X; \tilde{X})$ is the mutual information of X and $\tilde{X}$, $H(X)$ is Shannon entropy of X, $p(\tilde{x}, x)$ is the joint probability distribution function of X and $\tilde{X}$, and $p(x)$ and $p(\tilde{x})$ are the marginal probability distribution functions of X and $\tilde{X}$ respectively. Furthermore, a closed-form analytical solution to $\tilde{X}$ can exist. In this regard, if the Gaussian assumption on $(\tilde{x})$ is removed, there is no closed-form solution to the entropy equation. Therefore, the entropy of the transformation is estimated by the condition monitoring system 100 using a probability distribution estimator such as Parzen window estimate. The condition monitoring system 100 can utilize a window of N number of data points to find an approximate solution $\hat{H}(X|\tilde{X})$ to perform the estimation. Note that the condition monitoring system 100 can impose a continuity constraint to the transformation where the probability distribution of the transformed data is non-zero within the support of the distribution.

At block 360, the computer sub-system 101 executes analytic operations regarding clustering, classification, and regression. That is, once the heterogeneous data is transformed into continuous domain, the condition monitoring system 100 can utilize uses machine learning for monitoring the condition of an elevator.

In accordance with one or more embodiments, the condition monitoring system 100 executes an unsupervised learning (e.g. clustering) to learn groupings of events. All originally numeric and transformed data can be used to learn (train) a model of event clusters. These clusters are then assigned by the condition monitoring system 100 a disposition (e.g. trapped passenger, testing) based on historical data. When new data arrives it is first transformed to continuous domain (or normalized if already continuous), and then the predetermined clusters are used to determine the disposition.

In accordance with one or more embodiments, the condition monitoring system 100 executes supervised classification. In this case, the transformed data are organized by the condition monitoring system 100 as the feature set and the elevator dispositions become the target classes. Historical data is used by the condition monitoring system 100 to learn a model of mapping between the features set and the class set, and the learnt (trained) model is used by the condition monitoring system 100 for predicting elevator disposition (e.g., healthy or unhealthy, specific component fault) from new data.

In accordance with one or more embodiments, the condition monitoring system 100 executes learning (training) a data-driven model of labeled elevator condition using transformed data with (i.e., regression) and predicting the elevator condition or future maintenance call using the learnt (trained) model. While various machine learning methods exist for regression (e.g. linear regression, support vector regression, decision tree regression etc.), the condition monitoring system 100 prefers to utilize a low-order model.

As shown in FIG. 3, the computer sub-system 101 can execute the analytic operations with respect to the normalized numerical data and the categorical data 322 separately. Note that the normalized numerical data and the categorical data 322 can collectively be referred to as transformed data.

At block 370, the computer sub-system 101 executes prediction operations such as future elevator health and subsequent maintenance requirements with respect to present event dispositions and elevator conditions.

Embodiments herein can include a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages, and scripting languages such as python or R or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the embodiments herein.

Aspects of the embodiments herein are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A condition monitoring system for performing a transformation of mixed elevator data, the condition monitoring system comprising:
   a computer sub-system comprising a memory storing transformation software thereon, and a processor coupled to the memory,
   the processor configured to execute the transformation software to cause the condition monitoring system to:
   acquire quantitative and qualitative information;
   transform the quantitative and qualitative information to produce transformed information;
   execute analytics on the transformed information; and
   generate predictions based on the analytics of the transformed information.

2. The condition monitoring system of claim 1, wherein the qualitative information comprises non-numerical data.

3. The condition monitoring system of claim 2, wherein the qualitative information comprises categorical data.

4. The condition monitoring system of claim 3, wherein the transformation of the quantitative information comprises executing a mutual information based feature transformation on the categorical data to produce continuous data.

5. The condition monitoring system of claim 4, wherein the mutual information based feature transformation preserves a probability distribution of the categorical data to provide an equivalence value to the categorical data.

6. The condition monitoring system of claim 1, wherein the quantitative information comprises numerical data.

7. The condition monitoring system of claim 6, wherein the transformation of the quantitative information comprises normalizing the numerical data to produce normalized numerical data.

8. The condition monitoring system of claim 1, wherein the quantitative and qualitative information is derived from an elevator sub-system of the condition monitoring system.

9. The condition monitoring system of claim 1, wherein the quantitative and qualitative information is stored on a database of the condition monitoring system.

10. A processor-implemented method for performing a transformation of mixed elevator data, the processor-implemented method being implemented by transformation software stored on a memory of a computer sub-system, the transformation software being executed by a processor of the computer sub-system, the processor being coupled to the memory, the processor-implemented method comprising:
    acquiring, by the processor, quantitative and qualitative information;
    transforming, by the processor, the quantitative and qualitative information to produce transformed information;
    executing, by the processor, analytics on the transformed information; and
    generating, by the processor, predictions based on the analytics of the transformed information.

11. The processor-implemented method of claim 10, wherein the qualitative information comprises non-numerical data.

12. The processor-implemented method of claim 11, wherein the qualitative information comprises categorical data.

13. The processor-implemented method of claim 12, wherein the transformation of the quantitative information comprises executing a mutual information based feature transformation on the categorical data to produce continuous data.

14. The processor-implemented method of claim 13, wherein the mutual information based feature transformation preserves a probability distribution of the categorical data to provide an equivalence value to the categorical data.

15. The condition monitoring system of claim 10, wherein the quantitative information comprises numerical data.

16. The processor-implemented method of claim 15, wherein the transformation of the quantitative information comprises normalizing the numerical data to produce normalized numerical data.

17. The processor-implemented method of claim 10, wherein the quantitative and qualitative information is derived from an elevator sub-system of the condition monitoring system.

18. The processor-implemented method of claim 10, wherein the quantitative and qualitative information is stored on a database of the condition monitoring system.

* * * * *